US008317888B2

(12) United States Patent
Criniere

(10) Patent No.: US 8,317,888 B2
(45) Date of Patent: *Nov. 27, 2012

(54) LIQUID SUSPENSIONS AND POWDERS OF CERIUM OXIDE PARTICLES AND POLISHING APPLICATIONS THEREOF

(75) Inventor: Guillaume Criniere, Ixelles (BE)

(73) Assignee: Rhodia Operations, Aubervilliers (FR)

( * ) Notice: Subject to any disclaimer, the term of this patent is extended or adjusted under 35 U.S.C. 154(b) by 533 days.

This patent is subject to a terminal disclaimer.

(21) Appl. No.: 12/444,746

(22) PCT Filed: Oct. 4, 2007

(86) PCT No.: PCT/EP2007/060549
§ 371 (c)(1),
(2), (4) Date: Dec. 4, 2009

(87) PCT Pub. No.: WO2008/043703
PCT Pub. Date: Apr. 17, 2008

(65) Prior Publication Data
US 2010/0072417 A1    Mar. 25, 2010

(30) Foreign Application Priority Data
Oct. 9, 2006   (FR) ..................... 06 08838

(51) Int. Cl.
*B24D 3/02* (2006.01)
*C09C 1/68* (2006.01)
*C09K 3/14* (2006.01)

(52) U.S. Cl. .............. 51/307; 51/308; 51/309; 438/689; 438/690; 438/691; 438/692; 438/693

(58) Field of Classification Search .................. None
See application file for complete search history.

(56) References Cited

U.S. PATENT DOCUMENTS

| 5,466,428 | A | 11/1995 | David et al. |
| 5,938,837 | A | 8/1999 | Hanawa et al. |
| 6,045,716 | A * | 4/2000 | Walsh et al. ..................... 216/88 |
| 6,797,626 | B2 * | 9/2004 | Miyairi et al. ................ 438/692 |
| 6,811,758 | B1 * | 11/2004 | Pickering et al. ............ 423/21.1 |
| 2006/0150526 | A1 * | 7/2006 | Ota et al. ........................ 51/307 |
| 2007/0084134 | A1 * | 4/2007 | Wang et al. ..................... 51/309 |

FOREIGN PATENT DOCUMENTS

| DE | 102 51 029 A1 | 5/2004 |
| EP | 0 298 808 A1 | 1/1989 |
| EP | 0 875 547 A2 | 11/1998 |
| EP | 0 947 469 A2 | 10/1999 |
| EP | 1 201 725 A1 | 5/2002 |

* cited by examiner

OTHER PUBLICATIONS

Chen et al., "Synthesis of nanocrystalline cerium oxide particles by the precipitation method", Ceramics Int'l, 2005, pp. 795-802, vol. 31, No. 6.

*Primary Examiner* — Duy Deo
(74) *Attorney, Agent, or Firm* — SNR Denton US LLP

(57) ABSTRACT

Suspensions of cerium oxide particles in which the particles (secondary particles) have an average size not exceeding 200 nm, such secondary particles being comprised of primary particles having an average size not exceeding 100 nm with a standard deviation having a value not exceeding 30% of the value of this average size, are prepared from a solution of a cerium-III salt, including cerium IV or hydrogen peroxide, which is contacted with a base in the presence of nitrate ions and in an inert atmosphere; the medium thus obtained is subjected to a thermal processing in an inert atmosphere, then acidified and scrubbed and the powder is obtained by drying and calcining of the suspension, which suspension and powder are useful for polishing applications.

24 Claims, 2 Drawing Sheets

LIQUID SUSPENSIONS AND POWDERS OF
CERIUM OXIDE PARTICLES AND
POLISHING APPLICATIONS THEREOF

CROSS-REFERENCE TO PRIORITY/PCT
APPLICATIONS

This application claims priority under 35 U.S.C. §119 of FR 0608838, filed Oct. 9, 2006 and is the national phase of PCT/EP 2007/060549, filed Oct. 4, 2007 and designating the United States (published in the French language on Apr. 17, 2008, as WO 2008/043703 A2; the title and abstract were also published in English), each hereby expressly incorporated by reference in its entirety and each assigned to the assignee hereof.

The present invention relates to a liquid suspension and a powder of cerium oxide particles, to processes for the preparation thereof and to the use thereof in particular in polishing.

The development of the electronics industry requires the increasingly considerable use of compositions for polishing various parts such as discs or dielectric compounds. These compositions are in the form of suspensions and they must correspond to a certain number of characteristics. For example, they must offer a high degree of removal of material, which reflects their abrasive capacity. They must also have a defectuosity which is as low as possible; the term "defectuosity" is intended to mean in particular the amount of scratches exhibited by the substrate once treated with the composition.

For reasons of stability and of ease of use, these suspensions must consist of particles of submicronic dimension, i.e. generally less than 300 nm. In addition, the presence of particles that are too fine in these suspensions reduces their abrasive capacities. Moreover, particles that are too large can contribute to an increase in the defectuosity. There is therefore a need for suspensions in which the particles are monodisperse. It should also be noted that, in order to obtain optimal performance levels, this monodispersity should apply both to the primary particles and to the secondary particles, i.e. the aggregates consisting of the primary particles.

It is thus understood that the development of these suspensions is a complex problem.

The object of the invention is to provide suspensions which correspond to the conditions described above, i.e. suspensions in which the particles are monodisperse.

With this aim, the suspension of the invention is a suspension of cerium oxide particles in a liquid phase, and it is characterized in that these particles (secondary particles) have an average size of at most 200 nm, these secondary particles consisting of primary particles whose average size is of at most 100 nm with a standard deviation of at most 30% of the value of said average size.

Other characteristics, details and advantages of the invention will emerge even more fully upon reading the description which follows, the various concrete but nonlimiting examples intended to illustrate it, and also the attached drawing in which.

Figure 1:
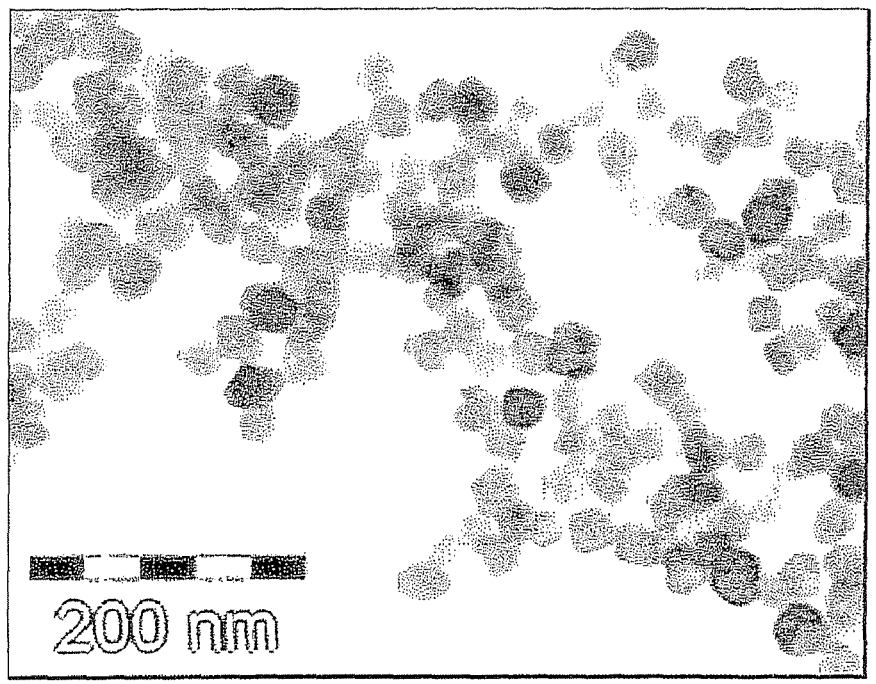
FIG. 1 is a photograph obtained by transmission electron microscopy of a product according to the invention.

For the remainder of the description, the expression "suspension of cerium oxide particles" denotes a system consisting of solid fine particles of submicronic dimension based on this oxide, stably dispersed in a liquid phase, it being possible for said particles to also optionally contain residual amounts of bound or adsorbed ions such as, for example, nitrates or ammoniums.

Still for the remainder of the description, the term "specific surface area" is intended to mean the B.E.T. specific surface area determined by nitrogen adsorption in accordance with standard ASTM D 3663-78 established based on the Brunauer-Emmett-Teller method described in the periodical "The Journal of the American Chemical Society, 60, 309 (1938)".

The particles of the suspension are based on cerium oxide which is generally crystalline ceric oxide.

The particles which constitute the suspension of the invention and which have an average size of at most 200 nm are called, in the remainder of the description, "secondary particles". These particles are aggregates aggregated from other, finer particles, subsequently called "primary particles".

According to an important characteristic of the invention, these primary particles are fine and monodisperse. They in fact have an average size of at most 100 nm with a standard deviation of at most 30% of the value of said average size The average value of the size of the primary particles is determined by the X-ray diffraction (XRD) technique. The value measured by XRD corresponds to the size of the coherent range calculated based on the breadth of the two most intense diffraction lines and using the Scherrer model. This value can also be determined by measuring the BET surface area.

The standard deviation mentioned in the present invention has the usual mathematical meaning, it is the square root of the variance and it is expressed by the formula:

$$\sigma = \sqrt{\frac{1}{n}\sum_{i=1}^{n}(x_i - \bar{x})^2}$$

n being the number of particles taken into account in the measurement, $x_i$ being the size of a particle i, $\bar{x}$ being the average value of the size of the particles $(1/n\Sigma_i x_i)$.

The size of the n various particles is measured using a photograph obtained by transmission electron microscopy (TEM).

This standard deviation can be preferably of at most 20%, more particularly at most 15%, and even more particularly at most 10% of the value of the average size of the primary particles.

The primary particles can more particularly have sizes which exhibit an average value of at most 80 nm, even more particularly of at most 60 nm.

These average sizes of primary particles can, moreover, be at least 10 nm, in particular at least 20 nm, and more particularly at least 30 nm. According to specific embodiments, these average sizes can thus be between 10 nm and 100 nm, 20 nm and 80 nm, 20 nm and 30 nm and 30 nm and 60 nm.

As indicated above, these primary particles form aggregates which thus constitute the secondary particles. These secondary particles can more particularly have an average size of at most 150 nm, more particularly of at most 120 nm and even more particularly of at most 100 nm.

Moreover, according to another advantageous characteristic of the invention, these secondary particles are themselves also monodisperse. They can in fact have a dispersion index of at most 0.5. This index can be in particular of at most 0.4, more particularly at most 0.3 and even more particularly at most 0.2.

For the entire description regarding the secondary particles, the average size and the dispersion index are the values obtained by implementing the laser diffraction technique using a laser particle sizer (distribution by mass).

The term "dispersion index" is intended to mean the ratio:

$$\sigma/m = (d_{90} - d_{10})/2d_{50}$$

in which:
- $d_{90}$ is the particle size or diameter for which 90% of the particles have a diameter of less than $d_{90}$;
- $d_{10}$ is the particle size or diameter for which 10% of the particles have a diameter of less than $d_{10}$;
- $d_{50}$ is the average size or diameter of the particles.

The liquid phase of the suspensions according to the invention may be of various nature.

It can first of all be water.

It can also be a water/water-miscible solvent mixture. As an example of a solvent of this type, mention may be made of alcohols such as methanol or ethanol, glycols such as ethylene glycol, acetate derivatives of glycols, such as ethylene glycol monoacetate, or polyols.

Finally, the liquid phase can consist of an organic solvent.

As an example of an organic solvent, mention may be made of aliphatic hydrocarbons such as hexane, heptane, octane or nonane, inert cycloaliphatic hydrocarbons such as cyclohexane, cyclopentane or cycloheptane, aromatic hydrocarbons such as benzene, toluene, ethylbenzene, xylenes, or liquid naphthenes. Also suitable are petroleum fractions of the Isopar or Solvesso type (trade marks registered by the company Exxon), in particular Solvesso 100 which contains essentially a mixture of methylethylbenzene and trimethylbenzene, Solvesso 150 which contains a mixture of alkylbenzenes, in particular of dimethylbenzene and of tetramethylbenzene, and Isopar which contains essentially $C_{11}$ and $C_{12}$ isoparaffinic and cycloparaffinic hydrocarbons. Other types of petroleum fractions that may also be mentioned include those of Petrolink® type from the company Petrolink or of Isane® type from the company Total.

Chlorinated hydrocarbons, such as chlorobenzene, dichlorobenzene or chlorotoluene, can also be used as organic solvent. Aliphatic and cycloaliphatic ethers or ketones, for instance diisopropyl ether, dibutyl ether, methyl ethyl ketone, methyl isobutyl ketone, diisobutyl ketone or mesityl oxide, can be envisaged.

Esters can be used, such as those derived from the reaction of acids with $C_1$ to $C_8$ alcohols, and in particular palmitates of secondary alcohols such as isopropanol. By way of example, mention may be made of butyl acetate.

Of course, the liquid phase can be based on a mixture of two or more hydrocarbons or compounds of the type described above.

The suspensions of the invention have an overall oxide content, i.e. cerium oxide content, which can vary within wide limits and which can, for example, be at most 40%, in particular at most 25% to 30% by mass of oxide.

Similarly, the pH of these suspensions can be within a broad range. Thus, the pH of the suspensions derived from the preparation processes that will be described below is generally between 2 and 6, more particularly between 2 and 5, the suspensions remaining stable within the meaning given here below, within this pH range. However the stability can be improved either within these ranges of pH either beyond the value of 5 or 6 in a known manner, by addition to the suspension of compounds such as anionic or zwitterionic polymers or molecules. As compounds of this kind one can mention those compounds obtained by polymerizing at least one monomer chosen among the following: an ethylenically unsaturated, linear or branched, aliphatic, cyclic or aromatic monocarboxylic or polycarboxylic acid or anhydride. Polyacrylic acid or citric acid may be mentioned as examples.

Finally, it will be noted that the suspensions of the invention are stable. This is intended to mean that no formation of a settling cake is observed on these suspensions before several days, for example at least 8 days. Furthermore, the settling cake, if it forms, can be resuspended by simple agitation.

Processes for preparing the suspensions of the invention will now be described.

According to a first embodiment, a suspension of the invention can be prepared by means of a process which comprises the following steps:
- (a) a solution of a cerium III salt which also comprises cerium IV is prepared;
- (b) this solution is brought into contact with a base, under an inert atmosphere, by virtue of which procedure a precipitate is obtained;
- (c) the medium obtained in the preceding step is subjected to a thermal treatment under an inert atmosphere, at least one of steps (a), (b) or (c) being carried out in the presence of nitrate ions;
- (d) an acidification and a washing of the medium thus obtained are carried out successively but in any order, by virtue of which procedure the suspension is obtained.

The first step (a) of the process above therefore consists in preparing a starting solution which is a solution of a cerium III salt.

As cerium III salts, use may more particularly be made of cerium III nitrate, chloride, sulphate or carbonate, and also mixtures of these salts, such as mixed nitrates/chlorides.

In the known manner, this starting solution should have the acidity suitable for the cerium to be entirely present in solution.

The starting solution also comprises cerium IV. The cerium IV is provided by a salt. This can, for example, be cerium IV nitrate.

Generally, the amount of cerium IV is such that the (CeIV/CeIII) molar ratio in the starting solution is between 1/5000 and 1/50, more particularly between 1/2000 and 1/50.

The starting solution prepared in step (a) can be degassed beforehand by bubbling with an inert gas. The term "inert gas" or "inert atmosphere" is intended to mean, for the present description, an atmosphere or a gas free of oxygen, it being possible for the gas to be, for example, nitrogen or argon.

The second step (b) of the process consists in reacting the starting solution with a base.

Products of the hydroxide type can in particular be used as base. Mention may be made of alkali metal or alkaline-earth metal hydroxides and aqueous ammonia. Secondary, tertiary or quaternary amines can also be used. However, the amines and the aqueous ammonia may be preferred since they reduce the risks of pollution by alkali metal cations or alkaline-earth metal cations.

The base can also be degassed beforehand by bubbling with an inert gas.

To perform the reaction of the second step of the process, the bringing into contact can be carried out in any order of introducing the reactants. However, it is preferable to introduce the starting solution into a medium containing the base.

The second step should be carried out under an inert atmosphere, either in a closed reactor or in a semi-closed reactor with sweeping with the inert gas. The bringing into contact is generally carried out in a stirred reactor.

Finally, this second step is generally carried out at ambient temperature (20° C.-25° C.) or a temperature of at most 50° C.

The third step (c) of the process is a thermal treatment of the reaction medium obtained at the end of the preceding step.

This treatment consists in heating the medium and in maintaining it at a temperature which is generally at most 95° C., and more particularly between 60° C. and 95° C.

The duration of this treatment can be between a few minutes and a few hours.

This treatment is also carried out under an inert atmosphere, the description with respect to this atmosphere for the second step being applied similarly here. Similarly the treatment is carried out in a stirred reactor.

According to one characteristic of the process of the invention, at least one of steps (a), (b) or (c) should be carried out in the presence of nitrate ions. In general, the nitrate ions are provided by the addition of nitric acid, more particularly in step (a), during the preparation of the cerium III solution.

The amount of nitrate ions, expressed by the $NO_3^-/Ce^{3+}$ molar ratio, is generally between 1/3 and 5.

The last step of the process, step (d), in fact comprises two successive operations which can be carried out in any order. These operations are, firstly, an acidification and, secondly, a wash.

These operations will be described more specifically below, for the case of a series in which acidification is followed by washing.

The acidification is generally carried out, after cooling of the medium obtained at the end of step (c), by the addition of an acid.

Any inorganic or organic acid can be used. Nitric acid is more particularly used.

The amount of acid added is such that the pH of the medium after acidification is between 2 and 5.

This operation can be carried out under air; it is no longer necessary to perform the procedure under an inert atmosphere at this stage of the process.

The acidification is followed by washing, the aim of which is to remove from the suspension the soluble species, essentially salts.

The washing can be carried out in various ways with or without solid/liquid separation.

It can thus be carried out by separating the solid particles from the liquid phase, for example by frontal filtration, settling out or centrifugation. The solid obtained is then resuspended in an aqueous phase. The process can also be carried out by tangential filtration.

This washing can be optionally repeated if necessary, for example until a given conductivity of the suspension is obtained, whereby the conductivity measures the amount of impurities present in this suspension.

As indicated above, the order of the operations can be reversed compared with that which has just been described. Thus, at the end of step (c), and, here again, generally after cooling of the medium obtained, washing can then carried out in the manner described above. At the end of the washing, the acidification of the medium obtained is then carried out.

At the end of the steps which have been described, it is possible to treat the suspension which has been obtained in a known deagglomeration apparatus such as an apparatus of ultrasonic treatment, of double impact jet treatment or a wet milling apparatus.

A suspension according to the invention is obtained at the end of step (d).

In the case of a suspension partially or completely in an organic solvent medium other than water, this suspension can be prepared, in a manner known per se, from an aqueous suspension as obtained by means of the process which has just been described and by bringing into contact with the organic solvent.

At this stage, it may be advantageous to add to the organic phase a promoter agent whose function is to accelerate the transfer of the particles from the aqueous phase to the organic phase and to improve the stability of the organic suspensions obtained.

As a promoter agent, use may be made of compounds comprising an alcohol function, and most particularly linear or branched aliphatic alcohols having from 6 to 12 carbon atoms. As specific examples, mention may be made of 2-ethylhexanol, decanol, dodecanol, or mixtures thereof.

The bringing into contact can be carried out at ambient temperature, for example approximately 20° C., but also at a higher temperature, for example in a range of from 60° C. to 150° C.

The separation between the aqueous and organic phases is carried out, for example, by distillation, by settling out or by centrifugation depending on the nature of the organic solvent.

A second embodiment of the process will now be described.

This second embodiment differs from the first only by virtue of the first step.

This first step consists in preparing a solution of a cerium III salt which also comprises aqueous hydrogen peroxide.

That which was described above with respect to the nature of the cerium III salt applies similarly here.

The amount of $H_2O_2$ solution is such that the ($H_2O_2$/CeIII) molar ratio in the solution of cerium salt is between 1/10000 and 1/100, more particularly between 1/4000 and 1/100.

The remainder of the process according to this second embodiment takes place as described above for the first embodiment, i.e. the solution of the first step is brought into contact with a base, under an inert atmosphere, a heat treatment is carried out under an inert atmosphere, and the medium thus obtained is acidified and washed (steps (b), (c) and (d) as described above with the presence of nitrate ions in at least one of steps (a), (b) and (c)). That which was described above for all these subsequent steps and for the first embodiment of the process therefore applies similarly here for the second embodiment.

The invention also relates to a redispersible powder of cerium oxide particles. It is a characteristic of this powder that, after introduction into a liquid phase and redispersion in a liquid phase, it produces a suspension according to the invention as described above. The redispersion is carried out by simple agitation of the powder in the liquid phase.

This powder can be obtained from a suspension according to the invention by drying and then calcination at a temperature which may be, for example, at most 300° C., and in particular between 100° C. and 200° C., over a period which can range between a few minutes and a few hours.

The invention also relates to a suspension for polishing, comprising either a suspension as described above, or a suspension as obtained by means of the processes described above, or else a suspension obtained after redispersion of a powder according to the invention. This suspension can be used for polishing glass, for example in the crystal-making or mirror industry, flat glass, television screens or spectacles, or else for polishing ceramics or other materials of vitreous type. This suspension can also be used most particularly for CMP-type polishing in the electronics industry and therefore for polishing metal substrates which go to make up microprocessors, but also for polishing insulating layers of these same microprocessors, the suspension of the invention being particularly suitable for the polishing of said layers. These layers are generally made of silica (doped silica, porous silica).

In general, such suspensions comprise, in addition to the compound with abrasive property, such as the cerium oxide particles, additives such as a dispersing agent or an oxidant.

As other applications of the suspensions of the invention, mention may be made of catalysis, in particular for automobile post-combustion; in this case, the suspensions are used in the preparation of catalysts. The suspensions can also be used for their anti-UV properties, for example in the preparation of films of polymers (of the acrylic or polycarbonate type, for example), of paints, of papers or of cosmetic compositions, in particular in the preparation of anti-UV creams.

Examples will now be given.

EXAMPLE 1

A dilute solution of cerium nitrate is prepared by adding 380.8 g of a 2.88 M trivalent cerium nitrate solution, 163.0 mg of a 110V $H_2O_2$ solution and 877.9 g of deionized water. This solution, which has an $H_2O_2$/Ce molar ratio of 1/450, is loaded into a semi-closed reservoir and then degassed with vigorous agitation and with nitrogen bubbling for 2 hours.

A dilute solution of aqueous ammonia is prepared by adding 839.5 g of deionized water and a solution of 233.2 g of 28% aqueous ammonia. This solution is loaded into a semi-closed 2 l jacketed reactor and then subjected to agitation (stirrer with four inclined paddles at 300 rpm) and nitrogen bubbling for 2 hours.

The dilute cerium nitrate solution is then added, at ambient temperature, to the dilute aqueous ammonia solution over 30 min, with the same agitation and under nitrogen sweeping.

The temperature of the reaction mixture is then increased to 80° C. in approximately ¾ hour and then maintained at this temperature for 4 h, still with the same agitation and under nitrogen sweeping.

At the end of this heat treatment, the reaction mixture is left to cool and is then acidified to pH 2 by adding 68% nitric acid. The nitrogen sweeping is stopped and the suspension is finally washed by centrifugation, elimination of the centrifugation water and resuspension of the cake in deionized water. Several cycles of washing by centrifugation are carried out until a conductivity of less 0.5 mS/cm is obtained.

The suspension finally obtained is adjusted to 10 wt % with respect to $CeO_2$.

The suspension is observed by TEM. It is clearly observed that the primary particles are indeed monodisperse and of a size centred around 35 nm. On a photograph of approximately 150 particles (FIG. 1) representative of the suspension, each of the particles is counted and measured, by virtue of which an average size of 33 nm is obtained, with a standard deviation of 3.9 nm that is 12% of the value of the average size.

Part of the suspension is dried in an incubator at 200° C., which makes it possible to obtain a $CeO_2$ powder for XRD analysis. The X-ray diffractogram of this powder has the signature of crystalline $CeO_2$ (sheet ASTM 34-394). The average size of the zone of coherence calculated from the mid-height width of the diffraction peaks located at $2\theta=28.6°$, 47.5° and 56.4°, by application of the Scherrer model, gives 40 nm. The BET specific surface area determined by nitrogen adsorption is 23.5 m²/g, which gives an average size of the primary particles of 35 nm.

The size of the secondary particles is measured using a Horiba LA910 laser particle sizer, taking a value of 1.7 for the optical index of $CeO_2$ in water. The median size $d_{50}$ is 102 nm.

The dispersion index σ/m calculated based on the $d_{10}$, $d_{50}$ and $d_{90}$ values of 81, 102 and 128 nm, respectively, is 0.23.

EXAMPLE 2

A dilute cerium nitrate solution is prepared by adding 6.4 kg of a 2.88 M trivalent cerium nitrate solution (d=1.715), 1.0 kg of a 68% $HNO_3$ solution, 4.8 kg of deionized water and 8.87 g of 1.39 M tetravalent cerium nitrate (d=1.440). This solution, which has a $Ce^{4+}/Ce_{total}$ molar ratio of 1/1250, is loaded into a semi-closed reservoir and then degassed with vigorous agitation and with nitrogen bubbling for 2 hours.

A dilute aqueous ammonia solution is prepared by adding 22.6 kg of deionized water and a solution of 4.6 kg of 28% aqueous ammonia. This solution is loaded into a semi-closed 40 l jacketed reactor and then subjected to agitation (stirrer with four inclined pales at 400 rpm.) and nitrogen bubbling for 2 hours.

The dilute cerium nitrate solution is then added, at ambient temperature, to the dilute aqueous ammonia solution in 30 min, with the same agitation and under nitrogen sweeping.

The temperature of the reaction mixture is then increased to 83° C. in approximately ¾ hour and then maintained at this temperature for 4 h, still with the same agitation and under nitrogen sweeping.

At the end of this heat treatment, the reaction mixture is left to cool and is then acidified to pH 2 by adding 68% nitric acid. The nitrogen sweeping is stopped and the suspension is finally washed by centrifugation, elimination of the centrifugation water and resuspension of the cake in deionized water. Several cycles of washing by centrifugation are carried out until a suspension, which is finally adjusted to 10 wt % with respect to $CeO_2$ and which has a pH of 3.2 and an ionic conductivity of 0.38 mS/cm, is obtained.

Figure 2:
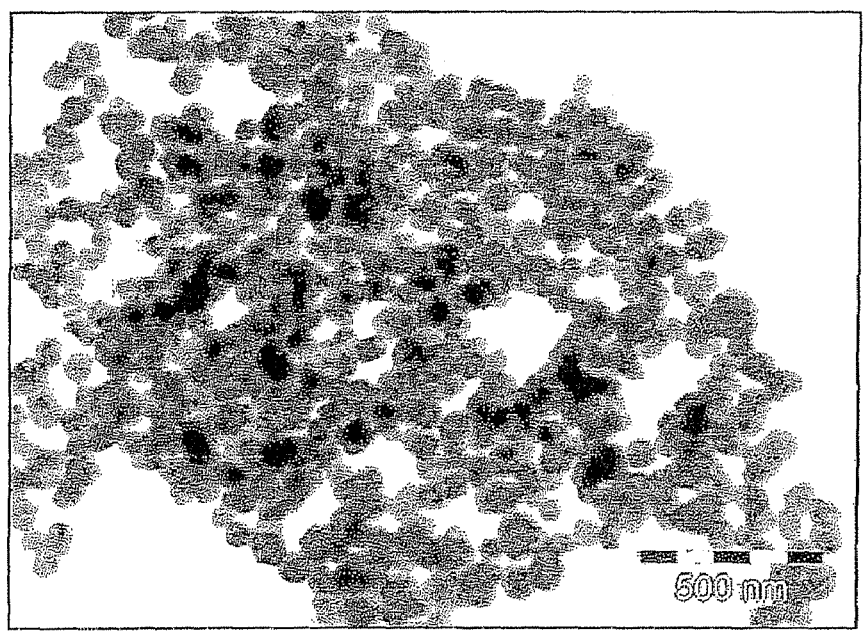
FIG. 2 is a photograph obtained by transmission electron microscopy of another product according to the invention.

The suspension is observed by TEM. It is noted that the primary particles are indeed monodisperse and of a size centred around 60 nm. On a photograph of several hundred particles (FIG. 2) representative of the suspension, each of the particles is counted and measured, by virtue of which an average size of 65 nm is obtained, with a standard deviation of 5.8 nm that is 9% of the value of the average size.

Part of the suspension is dried in an incubator at 200° C., which makes it possible to obtain a $CeO_2$ powder for XRD analysis. The X-ray diffractogram of this powder has the signature of crystalline $CeO_2$ (sheet ASTM 34-394). The average size of the zone of coherence calculated from the mid-height width of the diffraction peaks located at $2\theta=28.6°$, 47.5° and 56.4°, by application of the Scherrer model, gives 70 nm. The BET specific surface area determined by a nitrogen adsorption is 13.0 m²/g, which gives an average size of the primary particles of 64 nm.

The size of the secondary particles is measured using a Horiba LA910 laser particle sizer, taking a value of 1.7 for the optical index of $CeO_2$ in water. The median size $d_{50}$ is 112 nm. The dispersion index σ/m calculated from the $d_{10}$, $d_{50}$ and $d_{90}$ values of 84, 112 and 157 nm, respectively, is 0.32.

EXAMPLE 3

A cerium oxide suspension is prepared according to the same process as in Example 2, but with a $Ce^{4+}/Ce_{total}$ molar ratio in the dilute cerium nitrate solution of 1/1000 instead of 1/1250.

The suspension is characterized by a concentration of 10 wt % with respect to $CeO_2$, with a pH of 3.5 and an ionic conductivity of 0.18 mS/cm. The average size of the zone of coherence calculated on the basis of the mid-height width of the diffraction peaks located at 2θ=28.6°, 47.5° and 56.4°, by application of the Scherrer model, gives 54 nm. The BET specific surface area determined by a nitrogen adsorption is 19.0 m²/g, which gives an average size of the primary particles of 44 nm. The size of the secondary particles is measured using a Horiba LA910 laser particle sizer, taking a value of 1.7 for the optical index of $CeO_2$ in water. The median size $d_{50}$ is 110 nm. The dispersion index σ/m calculated from the $d_{10}$, $d_{50}$ and $d_{90}$ values of 85, 110 and 147 nm, respectively, is 0.28.

The suspension is dried overnight at 100° C. and then for 4 hours at 200° C., which makes it possible to obtain a powder.

This powder is redispersed in deionized water. The suspension thus obtained is characterized by a concentration of 10 wt % with respect to $CeO_2$, a pH of 3.5 and an ionic conductivity of 0.21 mS/cm. The size of the secondary particles is measured using a Horiba LA910 laser particle sizer, taking a value of 1.7 for the optical index of $CeO_2$ in water. The median size $d_{50}$ is 93 nm. The dispersion index σ/m calculated from the $d_{10}$, $d_{50}$ and $d_{90}$ values of 76, 93 and 116 nm, respectively, is 0.21.

EXAMPLE 4

A cerium nitrate solution is prepared by adding 13.84 kg of a 2.88 M trivalent cerium nitrate solution (d=1.715), 2.45 kg of a 60% $HNO_3$ solution, and 16.4 g of 1.35 M tetravalent cerium nitrate (d=1.43). This solution, which has a $Ce^{4+}$/$Ce_{total}$ molar ratio of 1/1500, is loaded into a semi-closed reservoir and then degassed with vigorous agitation and with nitrogen bubbling.

A dilute aqueous ammonia solution is prepared by adding 79.82 kg of deionized water and a solution of 9.25 kg of 25.7% aqueous ammonia. This solution is loaded into a semi-closed 100 l jacketed reactor and then subjected to agitation (impeller type stirrer at 130 rpm.) and nitrogen bubbling.

The cerium nitrate solution is then added, at ambient temperature, to the dilute aqueous ammonia solution in min, with the same agitation and under nitrogen sweeping.

The temperature of the reaction mixture is then increased to 80° C. in approximately 1 hour and then maintained at this temperature for 4 h, still with the same agitation and under nitrogen sweeping.

At the end of this heat treatment, the reaction mixture is left to cool and is then acidified to pH 2 by adding 68% nitric acid. The nitrogen sweeping is stopped and a fractional part of the suspension is finally washed by centrifugation, elimination of the centrifugation water and resuspension of the cake in deionized water. Several cycles of washing by centrifugation are carried out until 3.0 kg of a suspension, which is adjusted to 10 wt % with respect to $CeO_2$ and which has a pH of 4.8 and an ionic conductivity of 0.1 mS/cm, is obtained. A part of the suspension (before the addition of polyacrylic acid (PAA)) is dried in an incubator at 200° C., which makes it possible to obtain a $CeO_2$ powder. The BET specific surface area determined by a nitrogen adsorption is 13.8 m²/g, which gives an average size of the primary particles of 60 nm.

This suspension is added in 15 min. with vigorous agitation into 3.0 kg of a solution of PAA with a molecular weight Mw=1800 g/mol prepared previously by dilution in deionized water of 6 g of powder of PAA. After 15 min. of supplementary stirring, the reaction mixture is centrifuged and the supernatant is eliminated. The cake which is obtained is resuspended into deionized water and the pH is increased by addition of 28% ammonia solution to obtain a 10% weight $CeO_2$ suspension with a pH of 8.0.

Figure 3:
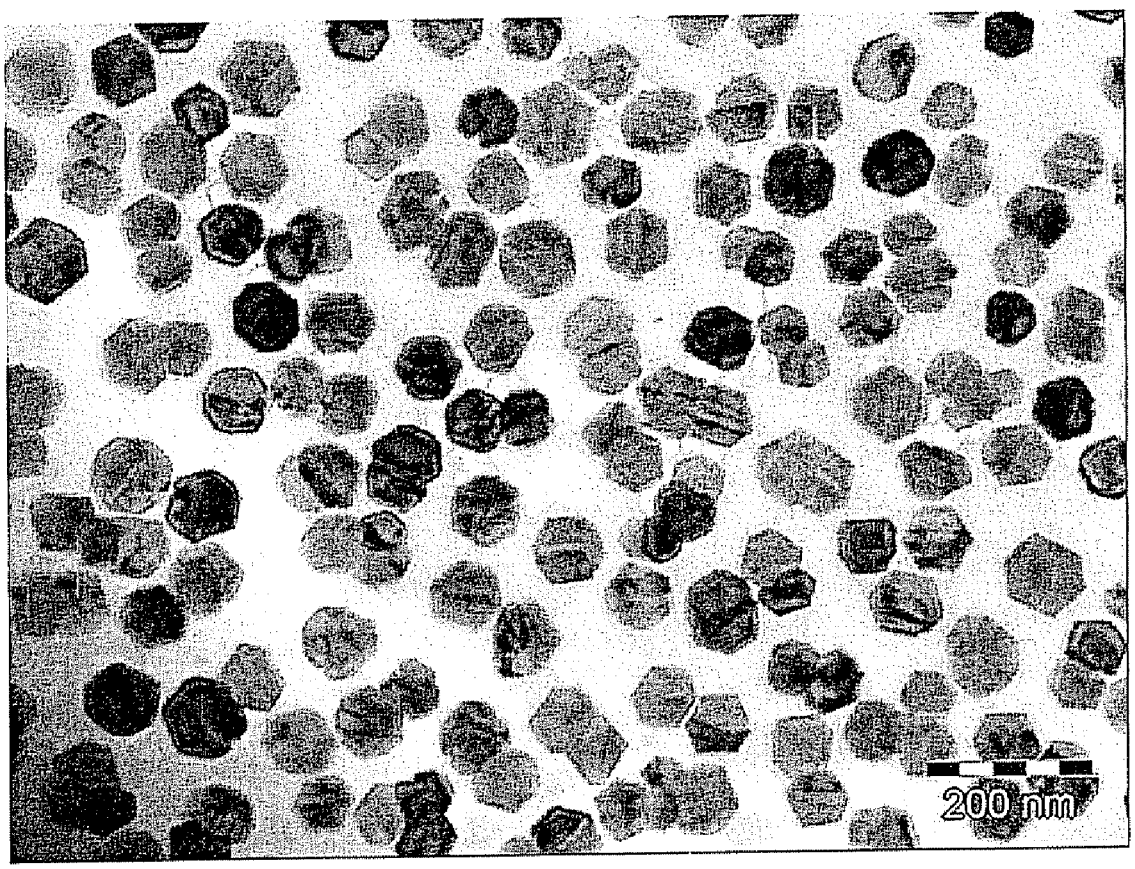
FIG. 3 is a photograph obtained by transmission electron microscopy of a third product according to the invention.

The suspension is observed by TEM. It is noted that the primary particles are indeed monodisperse and of a size centred around 60 nm. On a photograph of about 150 particles (FIG. 3) representative of the suspension, each of the particles is counted and measured, by virtue of which an average size of 66 nm is obtained, with a standard deviation of 9.2 nm that is 14% of the value of the average size.

The size of the secondary particles is measured using a Horiba LA910 laser particle sizer, taking a value of 1.7 for the optical index of $CeO_2$ in water. The median size $d_{50}$ is 97 nm. The dispersion index σ/m calculated from the $d_{10}$, $d_{50}$ and $d_{90}$ values of 80, 97 and 115 nm, respectively, is 0.18.

COMPARATIVE EXAMPLE 5

A cerium nitrate solution is prepared by adding 830.9 g of a 2.88 M trivalent cerium nitrate solution (d=1.715) and 129.5 g of a 68% $HNO_3$ solution. Thus this solution contains neither $H_2O_2$ nor $Ce^{4+}$. This solution is loaded into a semi-closed reservoir and then degassed with vigorous agitation and with nitrogen bubbling.

A dilute aqueous ammonia solution is prepared by adding 4950.2 g of deionized water and a solution of 423.9 g of 28% aqueous ammonia. This solution is loaded into a semi-closed 6 l jacketed reactor and then degassed with vigorous agitation and with nitrogen bubbling.

The cerium nitrate solution is then added, at ambient temperature, to the dilute aqueous ammonia solution in 30 min, with agitation and under nitrogen sweeping.

The temperature of the reaction mixture is then increased to 80° C. in approximately ¾ hour and then maintained at this temperature for 4 h, still under nitrogen sweeping.

At the end of this heat treatment, the reaction mixture is left to cool and is then acidified to pH 2 by adding 68% nitric acid. The nitrogen sweeping is stopped. It is noted that the solution which is obtained is translucent which indicates that the synthesis did not start and no suspension according to the invention was obtained.

The invention claimed is:

1. A suspension of cerium oxide particles in a liquid phase, said particles being secondary particles having an average size of at most 200 nm, and said secondary particles comprising primary particles whose average size is at most 100 nm with a standard deviation of at most 30% of the value of said average size of said primary particles.

2. The cerium oxide suspension as defined by claim 1, wherein the primary particles have sizes which exhibit a standard deviation of at most 20% of the value of said average size of said primary particles.

3. The cerium oxide suspension as defined by claim 2, wherein the primary particles have sizes which exhibit a standard deviation of at most 10% of the value of said average size of said primary particles.

4. The cerium oxide suspension as defined by claim 1, wherein the primary particles have sizes which exhibit an average value of at most 80 nm.

5. The cerium oxide suspension as defined by claim 4, wherein the primary particles have an average size of at least 30 nm.

6. The cerium oxide suspension as defined by claim 1, wherein the secondary particles have a dispersion index of at most 0.5.

7. The cerium oxide suspension according to claim 6, wherein the secondary particles have a dispersion index of at most 0.4.

8. The cerium oxide suspension as defined by claim 1, wherein the secondary particles have an average size of at most 150 nm.

9. The cerium oxide suspension as defined by claim 1, wherein the liquid phase comprises water.

10. The cerium oxide suspension as defined by claim 1, wherein the liquid phase comprises an organic solvent.

11. A process for preparing a cerium oxide suspension as defined by claim 1, comprising the following steps:
   (a) providing a solution of a cerium III salt which also comprises cerium IV;
   (b) treating this solution with a base, under an inert atmosphere, whereby a precipitate is obtained;
   (c) subjecting the medium obtained in the preceding step to a thermal treatment under an inert atmosphere, at least one of the steps (a), (b) or (c) being carried out in the presence of nitrate ions; and
   (d) acidifying and washing the medium thus obtained, whereby the suspension is obtained.

12. The process as defined by claim 11, wherein the solution of a cerium III salt of step (a) comprises cerium IV in a cerium IV/cerium III molar proportion of from 1/5,000 to 1/50.

13. The process as defined by claim 11, wherein the content of nitrate ions during at least one of the steps (a), (b) or (c), expressed by the $NO_3^{3-}/Ce^{3+}$ molar ratio, ranges from 1/3 to 5.

14. The process for preparing a cerium oxide suspension as defined by claim 1, comprising the following steps:
   (a) providing a solution of a cerium III salt which also comprises aqueous hydrogen peroxide;
   (b) contacting this solution with a base, under an inert atmosphere, whereby a precipitate is obtained;
   (c) subjecting the medium obtained in the preceding step to a thermal treatment under an inert atmosphere, at least one of the steps (a), (b) or (c) being carried out in the presence of nitrate ions; and
   (d) acidifying and washing the medium thus obtained, whereby the suspension is obtained.

15. The process as defined by claim 14, wherein the solution of the first step contains aqueous hydrogen peroxide in an $H_2O_2/CeIII$ molar proportion ranging of from 1/10,000 to 1/100.

16. The process as defined by claim 11, wherein the thermal treatment is carried out at a temperature of at most 95° C.

17. The process for preparing a cerium oxide suspension, comprising contacting a suspension as defined by claim 1 with an organic solvent.

18. A redispersible powder of cerium oxide particles, which, after redispersion in a liquid phase, provides a suspension as defined by claim 1.

19. A process for polishing a substrate, the said process comprising applying to the substrate, as the polishing agent therefor, the cerium oxide suspension as defined by claim 1.

20. The cerium oxide suspension as defined by claim 1, wherein the primary particles have sizes which exhibit an average value of at least 20 nm.

21. The cerium oxide suspension as defined by claim 1, wherein the primary particles have sizes which exhibit an average value of at least 10 nm.

22. The cerium oxide suspension as defined by claim 1, wherein the primary particles have sizes which exhibit an average value of at most 100 nm.

23. The cerium oxide suspension as defined by claim 1, wherein the primary particles have sizes which exhibit an average value of at most 60 nm.

24. The cerium oxide suspension as defined by claim 1, wherein the suspension is stable.

* * * * *